US009952624B2

(12) United States Patent
Suurpaa et al.

(10) Patent No.: US 9,952,624 B2
(45) Date of Patent: *Apr. 24, 2018

(54) COVER FOR AN ELECTRONIC DEVICE AND ELECTRONIC DEVICE WITH A COVER

(71) Applicant: NOKIA TECHNOLOGIES OY, Espoo (FI)

(72) Inventors: Kalle Suurpaa, Helsinki (FI); Antti Kujala, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,920

(22) Filed: Jan. 13, 2016

(65) Prior Publication Data
US 2016/0124561 A1    May 5, 2016

Related U.S. Application Data

(63) Continuation of application No. 10/516,887, filed as application No. PCT/IB02/02504 on Jun. 27, 2002, now Pat. No. 9,360,890.

(51) Int. Cl.
*G06F 3/0488* (2013.01)
*G06F 1/16* (2006.01)
(Continued)

(52) U.S. Cl.
CPC ............ *G06F 1/1632* (2013.01); *G06F 3/044* (2013.01); *G06F 3/0414* (2013.01);
(Continued)

(58) Field of Classification Search
CPC ........ G06F 3/044; G06F 3/045; G06F 3/0412; G06F 3/0414
See application file for complete search history.

(56) References Cited

U.S. PATENT DOCUMENTS 5,404,267 A    4/1995   Silva et al.
5,511,983 A    4/1996   Kashii et al.
(Continued)

FOREIGN PATENT DOCUMENTS

CN    1285989 A    2/2001
CN    1321289 A    11/2001
(Continued)

OTHER PUBLICATIONS

Office Action from U.S. Appl. No. 10/516,887 dated Jun. 29, 2007.
(Continued)

*Primary Examiner* — Alexander Eisen
*Assistant Examiner* — Mansour M Said
(74) *Attorney, Agent, or Firm* — Alston & Bird LLP

(57) ABSTRACT

The invention relates to a cover comprising a decoration 11 which is visible to a user when the cover is connected to an electronic device. In order to enhance the functions provided by such a cover, it is proposed that the cover further comprises contact sensitive means 22, 23 arranged such that they generate an electrical signal when a part 12 of the decoration 11 associated to the contact sensitive means 22, 23 is touched, and connection means 24, 25 for electrically connecting the contact sensitive means 22, 23 to processing means. The invention relates equally to an electronic device with such a cover.

20 Claims, 2 Drawing Sheets

(51) Int. Cl.
*H04M 1/725* (2006.01)
*G06F 3/041* (2006.01)
*G06F 3/044* (2006.01)
*H04M 1/02* (2006.01)

(52) U.S. Cl.
CPC ...... *G06F 3/0416* (2013.01); *H04M 1/72575* (2013.01); *H04M 1/0283* (2013.01); *H04M 2250/22* (2013.01)

(56) References Cited

U.S. PATENT DOCUMENTS

| | | | |
|---|---|---|---|
| 5,677,711 A | 10/1997 | Kuo | |
| 6,128,475 A | 10/2000 | Wicks et al. | |
| 6,208,271 B1 | 4/2001 | Armstrong | |
| 6,222,525 B1 | 4/2001 | Armstrong | |
| 6,259,045 B1* | 7/2001 | Imai | H01H 13/70 200/5 A |
| 6,317,313 B1 | 11/2001 | Mosgrove et al. | |
| 6,400,303 B2* | 6/2002 | Armstrong | H01H 13/785 200/511 |
| 6,492,978 B1 | 12/2002 | Selig et al. | |
| 6,518,953 B1* | 2/2003 | Armstrong | A63F 13/06 345/159 |
| 6,661,399 B1 | 12/2003 | Oh et al. | |
| 6,898,283 B2* | 5/2005 | Wycherley | H04B 1/401 379/428.01 |
| 6,999,804 B2 | 2/2006 | Engstrom et al. | |
| 7,149,559 B2 | 12/2006 | Qin et al. | |
| 7,187,363 B2 | 3/2007 | Nguyen et al. | |
| 7,268,673 B2 | 9/2007 | Wolff | |
| 7,305,260 B2 | 12/2007 | Vuori et al. | |
| 7,373,180 B2 | 5/2008 | Swanson et al. | |
| 7,599,709 B2 | 10/2009 | Kim | |
| 9,360,890 B2* | 6/2016 | Suurpaa | G06F 1/1632 |
| 2002/0000978 A1 | 1/2002 | Gerpheide | |
| 2002/0132634 A1 | 9/2002 | Hiltunen | |
| 2003/0017848 A1 | 1/2003 | Engstrom et al. | |
| 2003/0153281 A1 | 8/2003 | Abbasi et al. | |
| 2004/0101029 A1 | 5/2004 | Brunvoll | |
| 2005/0032557 A1 | 2/2005 | Brunstrom et al. | |
| 2007/0229475 A1* | 10/2007 | Gettemy | G06F 1/1626 345/173 |

FOREIGN PATENT DOCUMENTS

| | | |
|---|---|---|
| EP | 1 017 209 A2 | 7/2000 |
| EP | 1 107 101 A2 | 6/2001 |
| KR | 2001-40410 | 1/2003 |
| KR | 2003-0004755 A | 1/2003 |
| WO | WO 2001/18966 | 3/2001 |

OTHER PUBLICATIONS

Office Action from U.S. Appl. No. 10/516,887 dated Apr. 24, 2008.
Office Action from U.S. Appl. No. 10/516,887 dated Mar. 30, 2009.
Office Action from U.S. Appl. No. 10/516,887 dated May 24, 2010.
Office Action from U.S. Appl. No. 10/516,887 dated Mar. 14, 2011.
Office Action from U.S. Appl. No. 10/516,887 dated Feb. 6, 2012.
Final Rejection from U.S. Appl. No. 10/516,887 dated Dec. 11, 2007.
Final Rejection from U.S. Appl. No. 10/516,887 dated Nov. 13, 2008.
Final Rejection from U.S. Appl. No. 10/516,887 dated Nov. 20, 2009.
Final Rejection from U.S. Appl. No. 10/516,887 dated Nov. 10, 2010.
Final Rejection from U.S. Appl. No. 10/516,887 dated Oct. 12, 2011.
Final Rejection from U.S. Appl. No. 10/516,887 dated Jun. 14, 2012.
Notice of Allowanced from U.S. Appl. No. 10/516,887 dated Oct. 16, 2015.
International Search Report from International Application No. PCT/IB02/02504 dated Feb. 26, 2003.
International Preliminary Report on Patentability from International Application No. PCT/IB02/02504 dated Oct. 12, 1004.
Office Action from corresponding European Patent Application No. 02733181.8 dated Dec. 12, 2008, 3 pages.
Office Action from corresponding European Patent Application No. 02733181.8 dated Jan. 31, 2008, 4 pages.
Office Action from corresponding European Patent Application No. 02733181.8 dated Jul. 23, 2009, 4 pages.

* cited by examiner

COVER FOR AN ELECTRONIC DEVICE AND ELECTRONIC DEVICE WITH A COVER

CROSS-REFERENCE TO RELATED APPLICATIONS

This application is a continuation of and claims priority to U.S. application Ser. No. 10/516,887, filed on Jul. 25, 2005, which is a national phase entry of Patent Cooperation Treaty Application Serial No. PCT/IB2002/0002504, filed on Jun. 27, 2002. The contents of each of these applications is incorporated herein by reference.

FIELD OF THE INVENTION

The invention relates to a cover for an electronic device comprising a decoration which is visible to a user when the cover is connected to an electronic device. The invention relates equally to an electronic device with such a cover.

BACKGROUND OF THE INVENTION

It is well known to provide an electronic device like a mobile phone with an exchangeable cover, in order to protect the device or to give a desired appearance to the device.

A desired decoration can be realized for example by coloring the outer surface of the cover. Alternatively; a desired decoration can be realized with a preformed customized in-molding (CIM) sheet onto which a desired decoration is printed and which is fitted into a corresponding transparent mold in the cover.

It has also been proposed to employ covers with active decorations, which change their appearance according to some conditions or according to provided signals.

In document EP 1 017 209 A2, for instance, a cover is presented which includes liquid crystals changing their color with changes of temperature. Thereby, selected parts of the cover can be caused to change their color at predetermined temperatures.

For achieving an active decoration, it is moreover possible to integrate light emitting diodes (LEDs) into the cover, which LEDs are switched on and off according to signals provided by a micro-controller provided in the cover. The light provided by switched on LEDs is then visible to a user through the outer surface of the cover.

Instead of LEDs, also an electro-luminance decoration can be employed, in which electro-luminance patterns are controlled by a micro-controller of the cover. Covers with electro-luminance decoration can be manufactured like current CIM sheet decoration covers, i.e. electro-luminance patterns are printed on a film, which is preformed like current CIM sheets, and fitted into a corresponding mould of the cover.

SUMMARY OF THE INVENTION

It is an object of the invention to further enhance the functions a cover provides for an electronic device.

This object is reached according to the invention with a cover for an electronic device comprising a decoration which is visible to a user when said cover is connected to an electronic device. It is understood that the reference to a connection to an electronic device is only used for defining the side of the cover on which a decoration has at least to be present. It does not restrict the scope of protection to a cover that is actually connected to an electronic device. It is proposed that the cover further comprises contact sensitive means arranged such that they generate an electrical signal when a part of the decoration associated to the contact sensitive means is touched. It is understood that touching the decoration means touching the outer surface of the cover via which a decoration is presented to a user. It is also understood that the expression touching the decoration may include the requirement of applying a certain pressure. Moreover, it is propose that the cover comprises connection means for electrically connecting the contact sensitive means to processing means.

The object of the invention is equally reached with an electronic device comprising such a cover.

The invention proceeds from the idea that a cover can provide an interactive decoration, if contact sensitive means, in particular pressure sensitive means, are included in the cover for detecting a touching of the presented decoration or a touching of predetermined parts of the decoration. If in addition connecting means to some processing means are provided in the cover, the signals generated by the contact sensitive means can be provided to some processing means suited to realize a specific function. Thus, a user may call a function simply by touching or pressing the cover.

It is an advantage of the invention that it provides added value to a user by creating a simple user interface and interaction features.

Preferred embodiments of the invention become apparent from the subclaims.

The interactive decoration according to the invention can be realized with various technologies.

The contact sensitive means can be realized for example in form of a film. Such a film can comprise e.g. a printed on force sensitive resistors. It can also be an electromechanical film (EMFi™), which generates an electric charge when it is exposed to dynamic mechanical energy.

In case the contact sensitive means are realized as film, this film can be connected to a decoration film employed for presenting a specific decoration to a user. The combined films can then be inserted into the mold of a cover just like a conventional CIM sheet. In case a force sensitive resistor is to be employed for the contact sensitive means, the resistor can also be printed directly onto the backside of the decoration film.

It is an advantage of a film acting as contact sensitive means that only a small number of wires is required for connecting the contact sensitive means to processing means, for instance via a printed wiring board (PWB) provided in the cover.

Further, the contact sensitive means can be realized for example with printed capacitive wires in a decoration film employed for presenting a specific decoration to a user. This approach requires particularly simple mechanics and is based on a well-known technology.

Processing means employed for processing the signals generated by the contact sensitive means may also interact with a micro-controller used for controlling electro-luminance patterns in the decoration or for controlling LEDs provided in the cover.

The interactive decoration can be a "stand-alone" system, which interacts exclusively with processing means located within the cover. Alternatively, the interactive decoration of a cover can be connected electrically to processing means in an electronic device to which the cover is connected. Thereby, the cover can be used as an input device for specific functions provided by the electronic device. In case there is a data connection between the cover and the electronic device, the cover can be further enhanced to provide a forced feedback, for example with the aid of a vibra motor included in the cover.

The invention can be employed for a great variety of applications. It can be used, for example, for controlling an MP3 (moving picture expert group layer 3) player integrated in the cover or in an electronic device to which the cover is connected. In connection with an MP3 player, there might also be a representation of a record player printed onto a decoration film, while a virtual rotating record is presented by electro-luminance sectors in the decoration film. The user can then "scratch" the music output by the MP3 player by "rotating" the presented virtual record by finger, in case contact sensitive means are associated in addition to the virtually rotating record.

Moreover, the invention can be used for realizing e.g. electric drums, or a piano keyboard of which the keys are presented as decoration. In case such a keyboard decoration is realized as active decoration, the keyboard may even constitute a teaching keyboard, which indicates the respective key that is to be played for a specific tune by a corresponding illumination.

In case the cover is designed to provide ringing tones via a micro-controller, the invention might also enable a user of the electronic device to teach the micro-controller new sequences of notes. This does not require any additional data connection to the electronic device, and it provides an alternative way to program the micro-controller of the cover with special ringing tones.

The electronic device according to the invention can be in particular a mobile phone, and the cover according to the invention can be in particular an exchangeable cover for a mobile phone.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
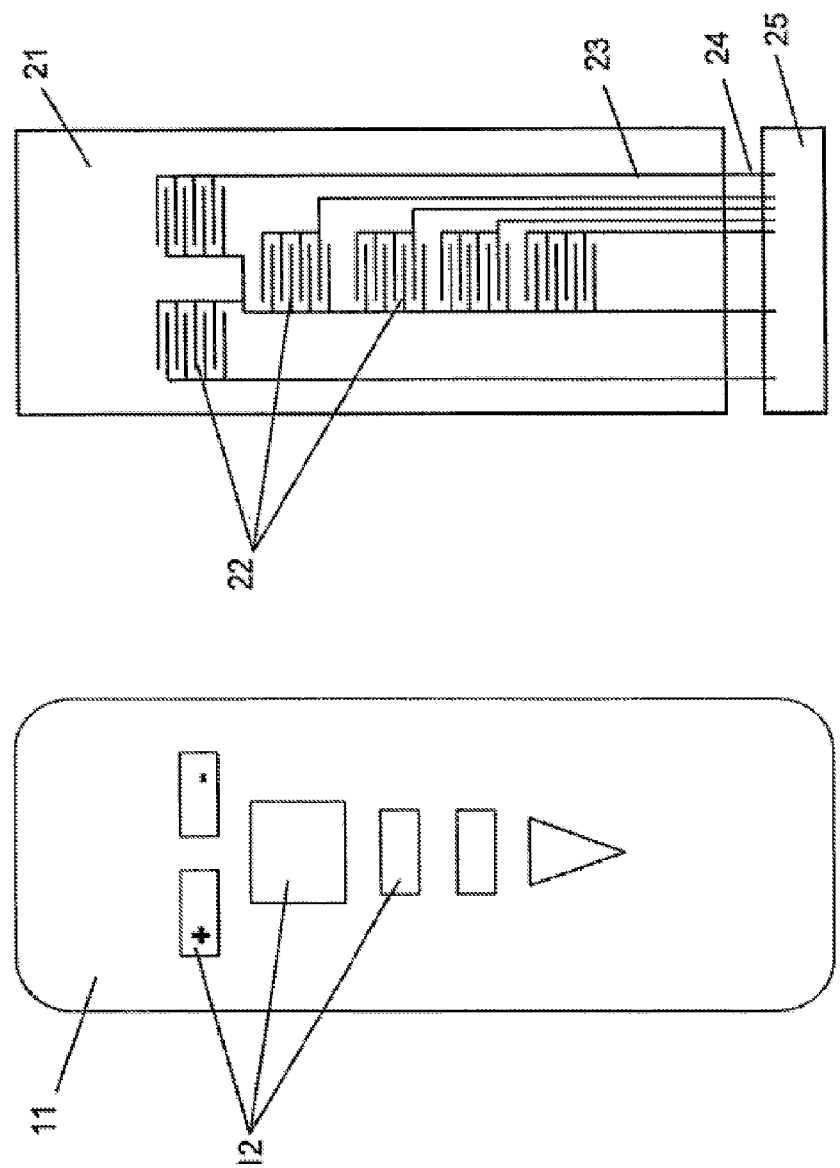
FIG. 1 illustrates an embodiment of a cover according to the invention.
Figure 2:
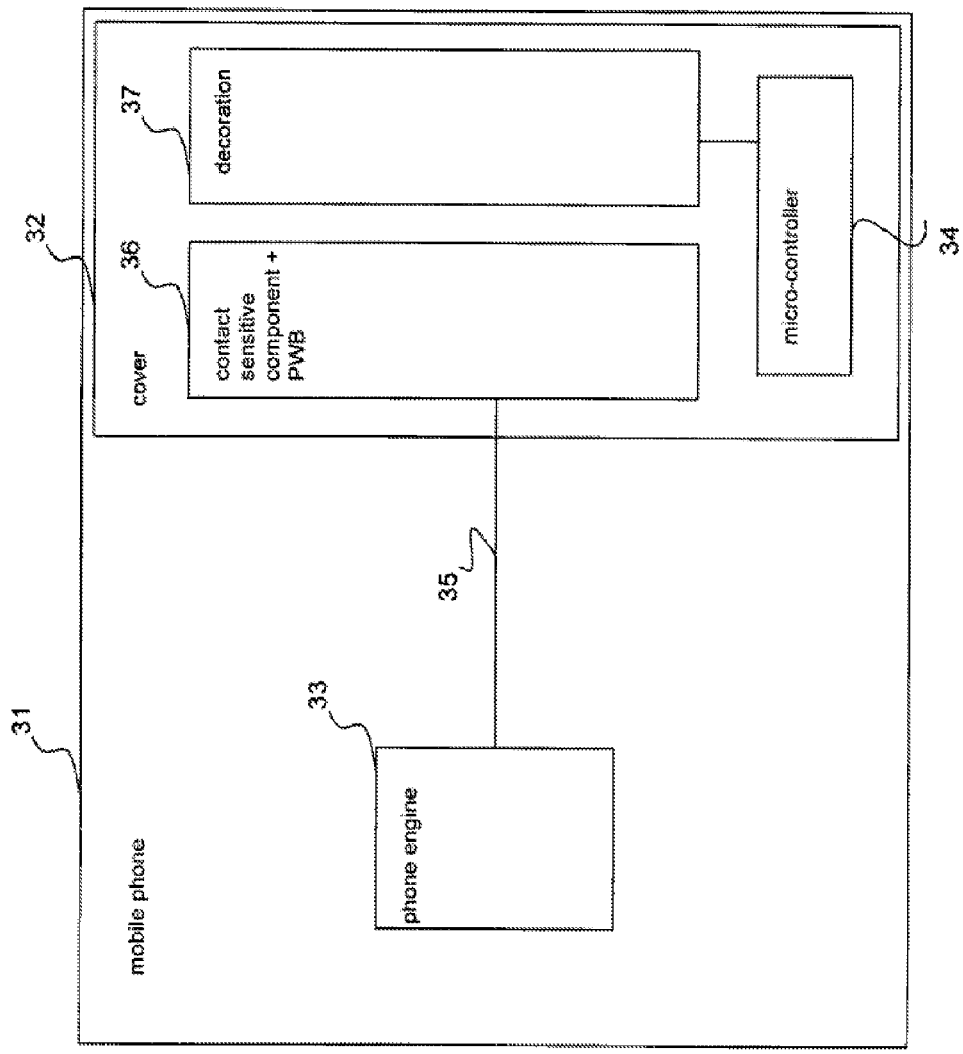
FIG. 2 illustrates a processor (in the form of an MP3 player) 38 to which the "contact sensitive component" plus the printed wiring board (PWB) 36 is connected.

FIG. 1 illustrates an embodiment of a cover according to the invention, which uses a capacitive key wire printing. The cover comprises an MP3 player and is connected to a mobile phone.

On the left hand side of the figure, the decoration 11 of the cover which is visible to a user of the mobile phone is presented. The decoration is printed on a preformed CIM sheet, which was fitted into a transparent mold of the cover. The decoration 11 consists in a representation of six control buttons 12 of an MP3 player, including e.g. play, stop and volume buttons. The decoration may also comprise electro-luminance patterns, which support the presentation by illuminating certain parts of the decoration based on signals provided by a micro-controller of the cover.

The CIM sheet 21 comprises in addition conductive printed wires. The arrangement of these wires is shown on the right hand side of FIG. 1. As can be seen in the figure, a separate capacitive sensor 22 is associated to each button 12 represented by the decoration 11 on the left hand side.

Each capacitive sensor 22 is arranged in the CIM sheet 21 immediately behind the representation of the associated button 12 on the surface of the CIM sheet.

For forming a separate capacitive sensor 22 for each of the six represented buttons 12, seven printed wires 23 are provided in the CIM sheet 21. These printed wires 23 are connected at the rim of the CIM sheet 21 to connection pins 24. In the CIM sheet 21, a respective plurality of open-ended parallel wires branches off at six different positions from a first one of the printed wires. Each set of the branched-off parallel wires extends behind a different one of the represented buttons 12. Moreover, each of the remaining six printing wires 23 splits up once into a plurality of open-ended parallel wires. The open-ended parallel wires of the remaining six printing wires 23 also extend behind a respective one of the six represented buttons 12, but from an opposite side than the parallel wires branched-off from the first printing wire which extend behind the respective represented button 12. The open-ended parallel wires of the respective two printed wires 23 further alternate behind each represented button 12. Thereby, the printed wires 23 form a separate capacitive sensors 22 for each button 12.

A change of capacity in each of the six formed capacitive sensors 22 can be detected unequivocally between a different pair of connection pins 24.

The connection pins 24 are further connected to the PWB 25 of the cover, to which also the MP3 player of the cover is connected.

A user of the mobile phone wishing to make use of the MP3 player integrated in the cover may touch one of the represented buttons 12, for example a represented play button. This leads to a change of capacity in the capacitive sensor 22 arranged behind the touched button 12. The change of capacity in this specific capacitive sensor 22 is registered by the MP3 player via the associated connection pins 24 and the PWB 25. As a result, the MP3 player will call the function associated to the touched button 12, e.g. the play function.

In an alternative embodiment, the MP3 player is comprised in the mobile phone, not in the cover itself. In this case, a data transfer indicating a respective change of capacity has to be enabled via the PWB between the cover and the phone engine.

It is to be noted that the described embodiments constitute only selected ones of a great variety of possible embodiments of the invention.

The invention claimed is:

1. A cover comprising:
   a user interactive decoration in said cover, which user interactive decoration is visible to a user;
   a contact sensitive component in said cover arranged such that it generates an electrical signal when a part of said user interactive decoration associated to said contact sensitive component is touched;
   a micro-controller provided in said cover to control the user interactive decoration; and
   a connection component in said cover configured to connect said cover to an electronic device, wherein the electronic device comprising at least one processor configured to be provided with said electrical signal generated by said contact sensitive component to at least realize a specific function, wherein said user interactive decoration associated to said contact sensitive component results in a generation of different signals used as an input device for specific functions provided by the electronic device.

2. The cover according to claim 1, wherein different parts of said user interactive decoration associated to said contact sensitive component result in a generation of different signals by said contact sensitive component when touched.

3. The cover according to claim 1, wherein one or more selected parts of said user interactive decoration are associated to one or more functions enabled by a processor to which said contact sensitive component can be connected via said connection component.

4. The cover according to claim 1, wherein said user interactive decoration comprises at least one light emitting diode which is controllable by a processing component, or at least one electroluminance pattern which is controllable by a processing component.

5. The cover according to claim 1, wherein one or more selected parts of said user interactive decoration are associated to one or more functions enabled by a processor to which said contact sensitive component can be connected via said connection component.

6. The cover according to claim 1, wherein the cover is exchangeable.

7. The cover according to claim 1, wherein said user interactive decoration comprises a representation of an application of the electronic device, the application configured to be operated by the user via the user interactive decoration.

8. The cover according to claim 7, wherein said electrical signal generated by said contact sensitive component is configured to at least realize a specific function of the application and said user interactive decoration associated to said contact sensitive component results in generation of different signals used as an input for specific functions provided by the application of the electronic device.

9. The cover according to claim 1, wherein the contact sensitive component is formed as a film, said film being connected to a decoration film of the user interactive decoration.

10. The cover according to claim 1, wherein the contact sensitive component is formed with printed capacitive wires in the decoration film.

11. The cover according to claim 1, wherein the contact sensitive component comprises at least one capacitive sensor.

12. An electronic device comprising:
a connection component configured to connect said electronic device to a cover, wherein said cover comprises a user interactive decoration visible to a user, a contact sensitive component in said cover arranged such that the contact sensitive component generates an electrical signal when a part of said user interactive decoration associated to said contact sensitive component is touched, and a micro-controller provided in said cover to control the user interactive decoration; and
at least one processor configured to be provided with said electrical signal generated by said contact sensitive component to at least realize a specific function, wherein said user interactive decoration associated to said contact sensitive component results in generation of different signals used as an input for specific functions provided by the electronic device.

13. The electronic device according to claim 12 wherein said connection component comprises a data connection to said cover and a processing component configured to process data received by said contact sensitive component of said cover.

14. The electronic device according to claim 12, wherein said contact sensitive component of said cover comprises a pressure sensitive film.

15. The electronic device according to claim 14, wherein said pressure sensitive film comprises at least one of the following: an electromechanical film and a force sensitive resistor.

16. The electronic device according to claim 12, wherein one or more selected parts of said user interactive decoration are associated to one or more functions enabled by said processor to which said contact sensitive component can be connected via said connection component.

17. The electronic device according to claim 12, wherein the connection component configured to connect said contact sensitive component to said processor of the electronic device, wherein the processor is configured to be provided with said electrical signal generated by said contact sensitive component to at least realize a specific function, wherein said user interactive decoration associated to said contact sensitive component result in a generation of different signals used as an input device for specific functions provided by the electronic device.

18. The electronic device according to claim 12, wherein the contact sensitive component is realized with printed capacitive wires in a decoration film of the user interactive decoration employed for presenting a specific decoration to a user.

19. The electronic device according to claim 12, wherein the contact sensitive component comprises a contact sensitive film that is connected to a decoration film of the user interactive decoration employed for presenting a specific decoration to a user.

20. A system comprising:
a user interactive decoration, which user interactive decoration is visible to a user;
a contact sensitive component arranged to generate an electrical signal when a part of said user interactive decoration associated to said contact sensitive component is touched;
a micro-controller to control the user interactive decoration; and
a connection component configured to connect said contact sensitive component to a processor, wherein the processor is configured to be provided with said electrical signal generated by said contact sensitive component to at least realize a specific function, wherein said user interactive decoration associated to said contact sensitive component results in generation of different signals used as an input device for specific functions provided by the processor.

* * * * *